(12) United States Patent
Michels et al.

(10) Patent No.: US 6,875,756 B1
(45) Date of Patent: Apr. 5, 2005

(54) METHOD AND DEVICE FOR THE CONTINUOUS, SINGLE-STEP PRODUCTION OF A HOMOGENEOUS SOLUTION OF CELLULOSE IN HYDROUS TERTIARY AMINOXIDES

(75) Inventors: Christoph Michels, Rudolstadt (DE); Andreas Diener, Groszschirma (DE)

(73) Assignee: Thuringisches Institut fur Textil und Kunststoff-Forschung E. V., Rudolstadt (DE)

(*) Notice: Subject to any disclaimer, the term of this patent is extended or adjusted under 35 U.S.C. 154(b) by 0 days.

(21) Appl. No.: 10/363,192
(22) PCT Filed: Sep. 5, 2000
(86) PCT No.: PCT/DE00/03035
§ 371 (c)(1), (2), (4) Date: Jun. 30, 2003
(87) PCT Pub. No.: WO02/20885
PCT Pub. Date: Mar. 14, 2002
(51) Int. Cl.⁷ ........................ A61K 31/715; C07H 1/00; C08B 37/00
(52) U.S. Cl. ..................... 514/57; 536/56; 536/124
(58) Field of Search .............. 514/57; 536/56, 536/124

(56) References Cited

U.S. PATENT DOCUMENTS

5,769,335 A * 6/1998 Shutov ................ 241/27
6,153,003 A * 11/2000 Lee et al. ............ 106/200.2

FOREIGN PATENT DOCUMENTS

DE 4439149 A1 * 5/1996 ............ C08L/1/02

* cited by examiner

Primary Examiner—James O. Wilson
Assistant Examiner—Everett White
(74) Attorney, Agent, or Firm—Bachman & LaPointe, P.C.

(57) ABSTRACT

A method and a device for the continuous, single-step production of a homogenous solution of cellulose in hydrous aminoxides on the basis of cellulose and aqueous aminooxides, preferably N-methylmorpholino-N-oxide (NMMO), at temperatures in the range of from 50 to 130° C. under a vacuum and water evaporation. The cellulose and the NMMO are dosed separately to the device, mixed while sheared, the water is evaporated until the mixture is dissolved, the solution is homogenized and directly fed to the consumer via screw conveyors, pumps and filters.

27 Claims, 3 Drawing Sheets

METHOD AND DEVICE FOR THE CONTINUOUS, SINGLE-STEP PRODUCTION OF A HOMOGENEOUS SOLUTION OF CELLULOSE IN HYDROUS TERTIARY AMINOXIDES

BACKGROUND OF THE INVENTION

This invention relates to a process and apparatus for continuous single-stage production of a homogeneous solution of cellulose in water-containing amine oxides from cellulose and aqueous amine oxides, preferably N-methylmorpholine N-oxide (NMMO), at temperatures in the range from 50 to 130° C. under reduced pressure by water evaporation.

The dissolving of cellulose in amine oxides having a defined water content and at temperatures above 70° C. is known (DRP 713 486; U.S. Pat. No. 3,447,939). The dissolving proceeds very slowly. The dissolving takes place substantially more rapidly when the cellulose is dispersed in aqueous NMMO and the excess water is subsequently distilled off under reduced pressure while stirring at temperatures above 85° C. to simultaneously dissolve the cellulose (GB 8 216 566).

It is further known to mix comminuted cellulose with water-containing NMMO in an annular layer mixer (WO 96/33221) or a horizontal mixing chamber equipped with rotor and radial stirring elements (WO 94/28217). The homogeneity of the suspension can be improved by high consistency grinding. The suspension is converted into a solution by means of thin film evaporators (EP 356 419) or in the shearing zone of a horizontal screw dissolver (DE 4 441 468).

It is further known to produce cellulose solutions continuously by, in a first stage, the cellulose and aqueous NMMO being dispersed in a horizontal twin-screw kneader and the suspension being metered via an intervessel continuously into a horizontal single-screw kneader and converted into a solution under reduced pressure by water evaporation (A. Diener and G. Raouzeos Chemical Fibers International 49 [1999] 3 p. 40–42; DE 19 837 210).

The processes all have in common that the cellulose solution is fundamentally produced in two spatially separate stages, namely on the one hand in the suspending of the comminuted cellulose in the highly water-containing amine oxide with or without aftertreatment and secondly in the converting of the suspension into the actual solution by shearing and water evaporation.

It is an object of the present invention to provide a process and apparatus for continuous single-stage production of a homogeneous solution of cellulose in water-containing amine oxides. In other words, cellulose and water-containing amine oxide, preferably NMMO, are continuously converted in one stage into a homogeneous cellulose solution in an apparatus without explicit transportation and metering of a suspension and fed to the potential consumer along the shortest possible path.

SUMMARY OF THE INVENTION

The foregoing object is achieved according to the invention by providing a process wherein
(a) water-containing cellulose is fed into the first section of an evacuated first shearing zone of a mixing/kneading reactor, homogenized and heat treated,
(b) preheated water-containing amine oxide is fed into the second section of the first shearing zone of the mixing/kneading reactor, mixed with the water-containing cellulose by shearing, homogenized and heated up with the onset of water evaporation,
(c) water is removed in the third section of the first shearing zone of the mixing/kneading reactor by kneading, shearing and heat-treating the suspension until complete transformation into a cellulose gel,
(d) the cellulose gel is converted in the second shearing zone of the mixing/kneading reactor into a homogeneous solution under reduced pressure by cooling, kneading and shearing,
(e) the homogeneous solution is separated by means of temperature-controlled screw conveyors, preferably in a twin-screw embodiment, from the evacuated part of the mixing/kneading reactor, transported and
(f) the homogeneous solution is directly fed to the consumer via pumps and safety filters.

BRIEF DESCRIPTION OF THE DRAWINGS

The invention will be described in greater detail with reference to the following detailed description and drawings wherein.

DETAILED DESCRIPTION

Figure 1:
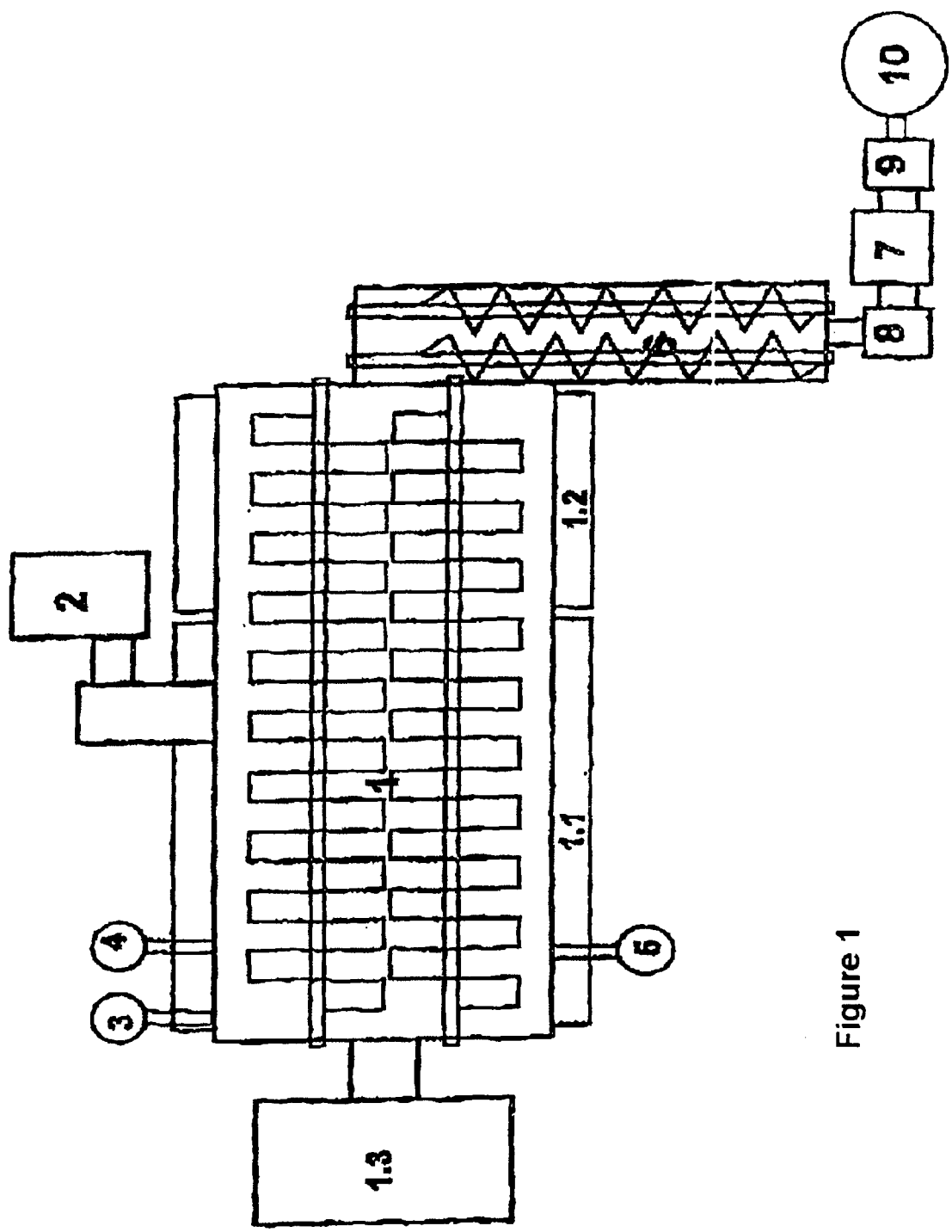
FIG. 1 schematically illustrates an apparatus in accordance with the present invention.

The solution quality is characterized by the particle content determined by means of laser diffraction and the size distribution of the particles as extensively described in the literature (Ch. Michels and F. Meister Das Papier 51 [1997]4 p. 161–165; B. Kosan and Ch. Michels Chemical Fibers International 49[1999]3 p. 50–54). It is convenient to try to express the particle content and the particle distribution in just one parameter, the so-called filter value. The filter value is defined as the ratio of the maximum particle diameter $X_m$ to the logarithm of the particle count $N_{10}$ in the size class 10 µm.

$$F_p = 10 \cdot \frac{X_m}{lg N_{10}}$$

Solutions having filter values<50 lead to very high spinning consistencies and filter values<100 to high spinning consistencies.

The solution state achieved is described by the zero shear viscosity, the relaxation time and the relaxation time spectrum which are all readily available from rheological data. The methods have likewise been extensively described in the literature (Ch. Michels, Das Papier 52[1998]1 p. 3–8). In an embodiment of the process according to the present invention, the cellulose or cellulose mixture is subjected to an activation. It can be a hydrothermal (DD 298 789) or enzymatic (DE 4 439 149) pretreatment. The activating of the cellulose increases the dissolving rate and improves solution quality.

In a further embodiment of the process according to the invention, a portion of the water-containing NMMO is replaced with diluents, for example ε-aminocaprolactam, piperidone, pyrrolidone or polyvinylpyrrolidone-methacrylate copolymer. The diluent lowers the melting point of the NMMO solvent and thus makes it possible to operate at a lower temperature.

In a further embodiment of the process according to the invention, additives are metered simultaneously with the cellulose or the water-containing amine oxide. The additives, for example cellulose derivatives, starch derivatives, titanium dioxide, silicates, kaolin, carbon black, chitosan, surfactants, polyethyleneimine, etc, can be solid, liquid and/or soluble in the amine oxide. Nonsoluble solid additives are advantageously mixed with the cellulose or metered separately. The stated object is further achieved according to the invention in relation to the apparatus mentioned in the beginning when a twin- or more highly screwed kneading/mixing reactor, having at least two heating/cooling zones and a rotary speed controlled drive unit, is assigned a vacuum station, two or more vacuum-tight metering units, a screw conveyor as discharge unit, a safety filter, two feed pumps and a potential consumer. It is convenient to use as the kneading/mixing reactor a horizontal twin-screw "Co Rotating Processor" (LIST AG Arisdorf Switzerland) having two heating/cooling zones and a freely chooseable screw speed to set the requisite shearing zone. The kneading/mixing screws of the reactor corotate. The first heating/cooling zone is assigned an open-loop control piston pump for metering water-containing cellulose, a heated pump having an adjustable closed-loop control valve for metering the water-containing NMMO and optionally one or more units for metering one or more additives. A vacuum station made up of one or more vacuum pumps and a condensation unit supplies the kneading/mixing reactor with the requisite underpressure to remove the water. A large-volume vertical twin-screw unit disposed at the outlet of the corotating processor separates off the kneading/mixing reactor on the vacuum side, takes over the feeding of the solution and simultaneously serves as a buffer to equalize demand fluctuations of the potential consumer. The twin-screw unit is followed by a safety filter situated between two pumps. The pumps and the safety filter are designed in such a way that a shear gradient of 5[1/s] is not exceeded. The pressure difference between the filter inlet and outlet is measured, recorded and achieves values in undisrupted operation which differ only insignificantly from zero.

In another embodiment of the apparatus according to the present invention, the kneading/mixing reactor used is an opposite rotating processor in which the kneading/mixing screws of the reactor rotate in opposite directions. The invention will be further illustrated with reference to drawings and examples. FIG. 1 shows the apparatus according to the present invention, comprising the kneading/mixing reactor 1 having heating/cooling zones 1.1 and 1.2 and a drive unit 1.3, the vacuum station 2, the metering units 3 4 5, the screw conveyor 6, the safety filter 7, the feed pumps 8 9 and the consumer 10.

EXAMPLE 1

The kneading/mixing reactor used was a "LIST-CRP 63 Batch Co-Rotating Processor" having two heating/cooling zones. 364 g/min of comminuted enzymatically pretreated and stabilized cellulose (cuoxam DP 540; molecular dispersity $U_\eta$=5.8; water content 49.0%) via an open-loop control piston pump and 1 405 g/min of preheated NMMO (water content 16.0%) at 85° C. via an open-loop control unit (made up of pump and closed-loop control valve) are metered in succession a minimal interval apart into the first shearing zone of the reactor. Pronounced shearing under an applied vacuum of 150 mbar produces intensive mixing and distillative removal of the excess water (about 222 g/min) with simultaneous heating of the suspension to a bulk temperature of 115° C. After passing through the first shearing zone (residence time 15–20 minutes), the mixture appears glassy, highly viscous and is present as a swollen gel. In the second shearing zone of the reactor, under continued shearing and with simultaneous cooling to a bulk temperature of 85° C., the gel is converted into a solution, which is subsequently taken up by the vertical twin-screw conveyor, further homogenized and fed to the precision gear pump. This conveys at a constant bulk temperature of 85° C. 1 334 ml/min of solution through a safety filter having a mesh size of 15 μm to the second pump, which feeds the same amount of solution to the consumer, a fiber spinning pilot plant. The pressure difference in the safety filter was zero even after many hours of operation. The solution had a composition of 12.0% by mass of cellulose, 76.3% by mass of NMMO and 11.7% by mass of water. The zero shear viscosity at 85° C. was 5 360 Pas, the relaxation time $\lambda_m$ at the frequency maximum was 5.4 seconds and the dispersity $U_\eta$=5.8.

The dispersity $U_\eta$ is obtained from the ratio of the zero shear viscosity $\eta_0$ to the "viscosity contribution $\eta$" at the crossing point of the dynamically recorded deformation curves [G'; G"=f(ω)], i.e. when the storage modulus G' and the loss modulus G" have the same magnitude.

$$U_\eta = \frac{\eta_0}{\eta''} - 1$$

The index η is intended to indicate that the dispersity results from rheological data and not from the determination of the number and mass averages of the molar mass.

Figure 2:
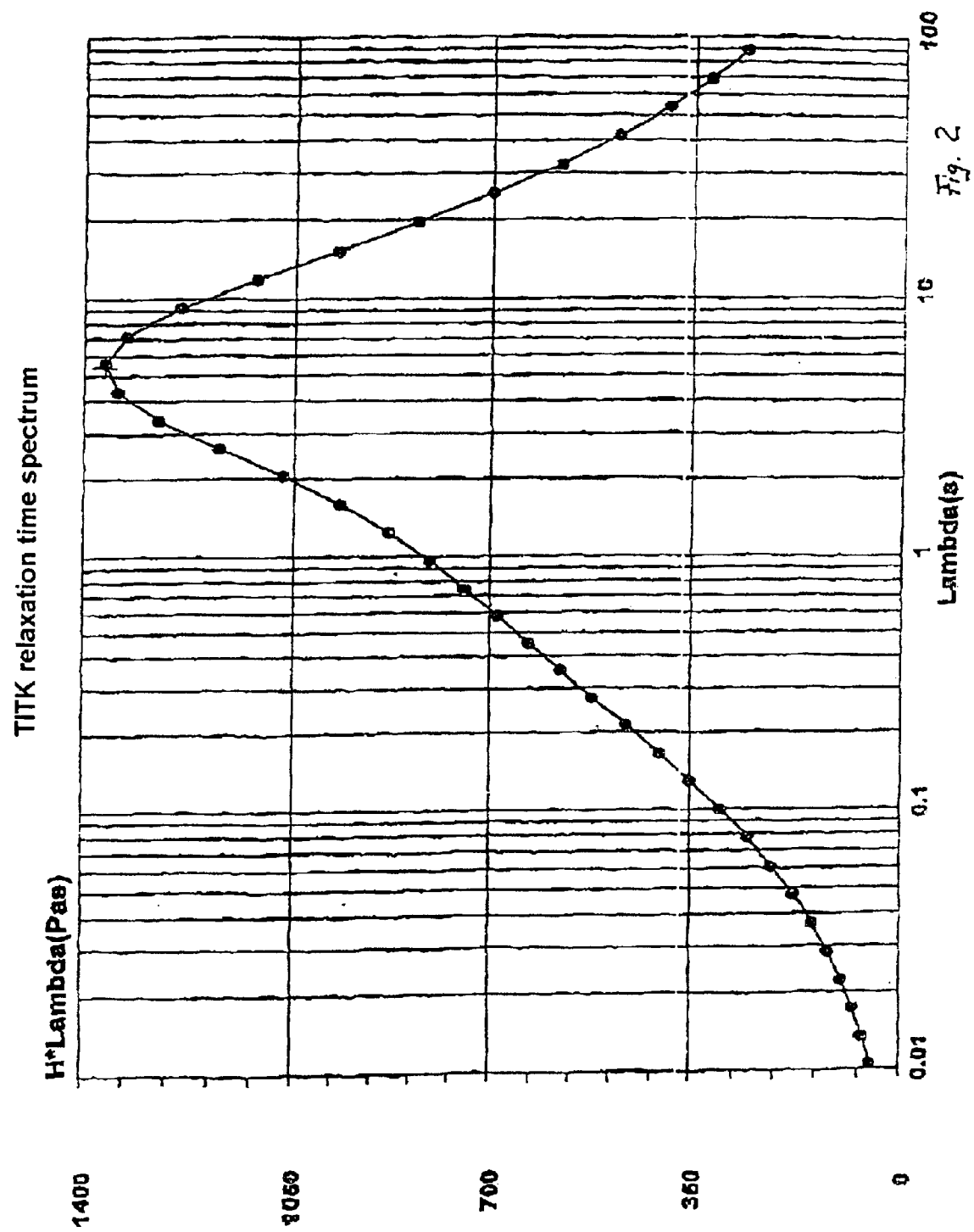
FIG. 2 is a relaxation spectrum for the cellulose material of Example 1.
Figure 3:
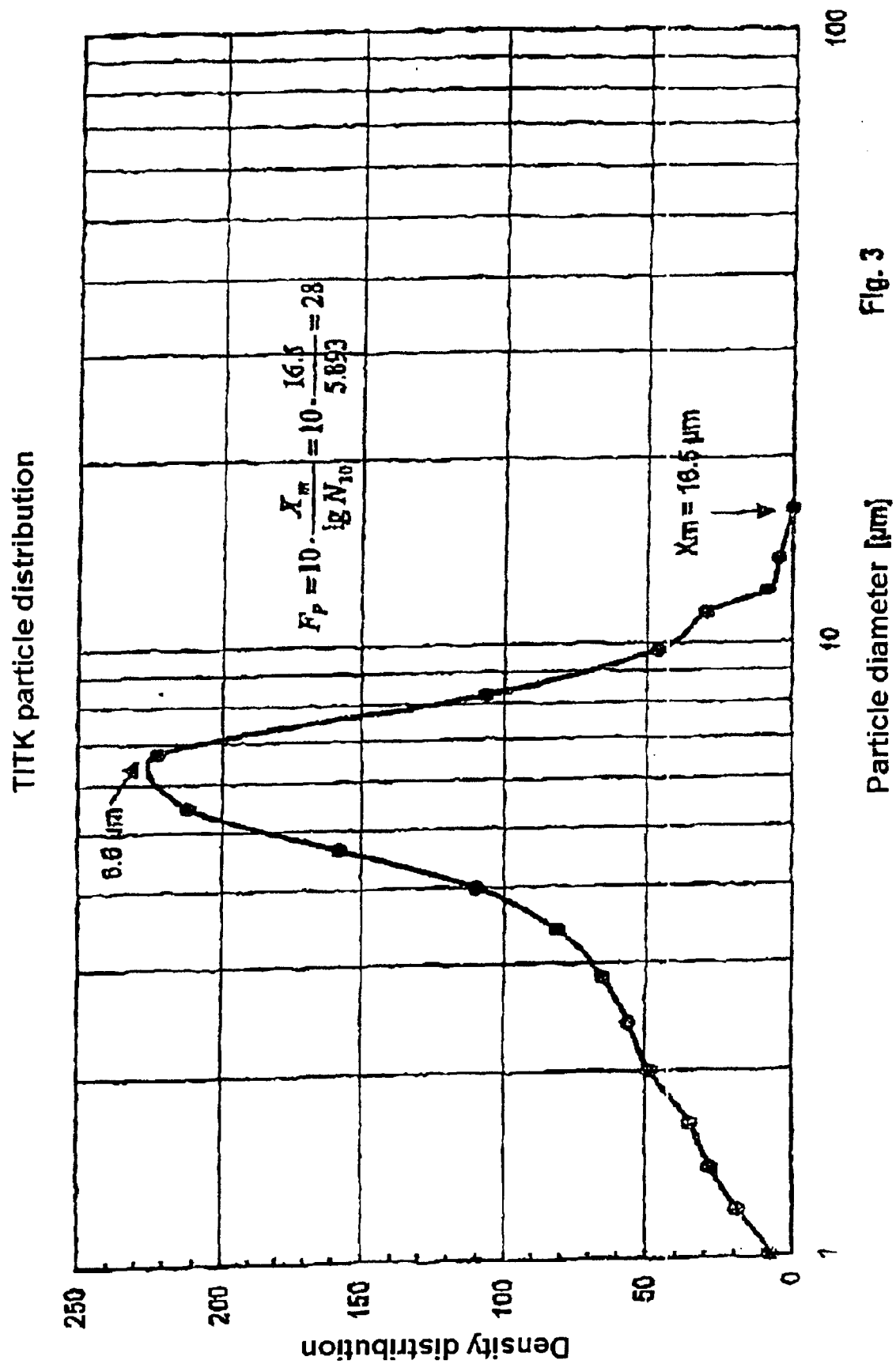
FIG. 3 is a particle size distribution for Example 1.

The solution has a relaxation time spectrum as depicted in FIG. 2 and a particle distribution (determined by laser diffraction) as depicted in FIG. 3. The particle content is 4.7 μl/kg of solution, the particle diameter frequency maximum is 6.6 μm, the maximum particle diameter is 16.5 μm and the filter value computed as 28.

EXAMPLE 2

Example 2 is carried out substantially similarly to Example 1, except that the mixing/kneading reactor used was an approximately equal-sized LIST-ORP Conti opposite rotating processor and the residence time in the reactor was higher by a factor of 1.5. The solution quality and the solution state substantially corresponds to that of the solution in Example 1.

EXAMPLE 3

The kneading/mixing reactor differs from that in Example 1 in that 3 components can be metered separately into the first shearing zone.

The open-loop control piston pump is used to meter 344 g/min of comminuted hydrothermally pretreated and stabilized cellulose having a water content of 46% by mass, comprising a mixture of 95 parts of spruce sulfite pulp (cuoxam DP 490; $U_\eta$=5.9) and 5 parts of cotton linters pulp (cuoxam DP 1900; $U_\eta$=3.4) and two separate open-loop control units (made up of pump and closed-loop control valve) are used to meter 1 328 g/min of preheated NMMO (water content 20% by mass) at 90° C. and 119 g/min of polyvinylpyrrolidone (PVP Produkt VP-MA91 W from BASF Ludwigshafen) which simultaneously contained 0.5% by mass of titanium dioxide. Shearing under an applied vacuum of 140 mbar produced intensive mixing, distillative removal of about 260 g/min of water with simultaneous heating of the suspension to 110° C. After the gel state has been attained, the second dissolving operation takes place with simultaneous cooling in the second shearing zone to 75° C. Screw conveyor, safety filter and pumps fed the consumer, a filament spinning machine for coarse denier filament yarns, with 1 530 g/min of spinning solution having a bulk temperature of 75° C. The solution consisted of 12.2% by mass of cellulose, 69.5% by mass of NMMO, 7.7% by mass of PVP and 10.6% by mass of water. The zero shear viscosity at 85° C. was 3 600 Pas, the relaxation time $\lambda_m$=6.5 seconds and the dispersity $U_n$=5.8. The particle analysis revealed a particle content of 8.7 μl/kg of solution, a particle diameter at the frequency maximum of 10.5 μm and a filter value of 56.

EXAMPLE 4

Example 4 was carried out similarly to Example 3, except that the mixing/kneading reactor used was a single-screw horizontal List Discotherm B-Conti. Instead of the polyvinylpyrrolidone copolymer the same amount of preheated ε-aminocaprolactam are metered in. The residence time has doubled and the solution quality substantially corresponds to the solution in example 3.

EXAMPLE 5

In a mixing/kneading reactor as per Example 3, 272 g/min of comminuted cellulose (cuoxam DP 430, water content 35% by mass, dispersity 6.8) via an open-loop control piston pump, 71 g/min of polyethyleneimine (commercial Polymin from BASF Ludwigshafen, molar mass>750 000, water content 50% by mass) via a precision gear pump and 1 232 g/min of NMMO (water content 23% by mass) via a pump and open-loop control valve are metered, mixed, heated to 120° C. under vacuum of 160 mbar and about 275 g/min of water are distilled off. The bright yellow solution forming in the second shearing zone is at the same time cooled to 80° C., taken over by the screw conveyor and fed via pumps and safety filter to the consumer, a fiber spinning plant, at a rate of 1 300 g/min. The solution consists of 13.6% by mass of cellulose, 2.7% by mass of polyethyleneimine, 73.0% by mass of NMMO and 10.7% by mass of water. The zero shear viscosity at 85° C. is 5 100 Pas, the relaxation time at the frequency maximum is 1.7 seconds, the particle content is 5.2 μl/kg of solution, the particle diameter at the frequency maximum is 9.5 μm and the filter value is 45.

EXAMPLE 6

The kneading/mixing reactor used is a LIST CRP 250 Conti corotating processor having a drive unit for the rotary speed range of 80–120 rpm, 2 heating/cooling zones and 2 metering stubs. 924 g/min of comminuted and enzymatically pretreated cellulose (eucalyptus pulp, cuoxam DP 580, dispersity 5.9, water content 45% by mass) are metered into the first stub and 3 673 g/min of NMMO (water content 45% by mass) into the second stub similarly to Example 1. In the first shearing zone, intensive mixing and kneading under vacuum of 160 mbar is effected with heating of the suspension to 120° C. with simultaneous evaporation of 533 g/min of water until the solution has transformed to the gel state. In the second shearing zone, a homogeneous solution is produced by simultaneous cooling to 82° C. and is taken over by a vertical twin-screw conveyor and fed via two pumps and a safety filter to the consumer at a rate of 3 474 ml/min. The solution consisted of 12.5% by mass of cellulose, 75.9% by mass of NMMO and 11.6% by mass of water, its zero shear viscosity was 6 760 Pas, the relaxation time at the frequency maximum was 6.3 seconds, the particle content was 8.4 μl/kg of solution, and the particle diameter at the frequency maximum was 8.1 μm and the filter value was 32.

What is claimed is:

1. A process for continuous single-stage production of a homogeneous solution of cellulose and optionally additives in water-containing tertiary amine oxides and at temperatures in the range between 50 and 130° C. under reduced pressure by water evaporation, comprising (a) feeding a water-containing cellulose having a water content of between 30 to 60% by mass water into a first section of an evacuated first shearing zone of a mixing/kneading reactor where the water-containing cellulose is, homogenized and heat treated, (b) feeding a preheated water-containing amine oxide into a second section of the first shearing zone of the mixing/kneading reactor and mixing same, with the water-containing cellulose by shearing to homogenized and heating the mixture up with the onset of water evaporation, (c) removing water in a third section of the first shearing zone of the mixing/kneading reactor by kneading, shearing and heat-treating the mixture to complete transformation into a cellulose gel, (d) converting the cellulose gel in a second shearing zone of the mixing/kneading reactor into a homogeneous solution under reduced pressure by cooling, kneading and shearing, (e) separating the homogeneous solution by means of temperature-controlled screw conveyors from an evacuated part of the mixing/kneading reactor, and (f) feeding the separated homogeneous solution to a consumer via pumps and safety filters.

2. A process as claimed in claim 1, wherein the water-containing cellulose contains 35–49% by mass of water.

3. A process as claimed in claim 1, wherein the cellulose is homogenized by heating in water and subsequently squeezed off.

4. A process as claimed in claim 1, wherein the cellulose is activated by hydrothermal pretreatment.

5. A process as claimed in claim 1, wherein the cellulose is activated by enzymatic pretreatment.

6. A process as claimed in claim 1, wherein the water-containing amine oxide is an N-methyl-morpholine N-oxide and contains at least 7% by mass of water.

7. A process as claimed in claim 1, herein the water-containing amine oxide contains diluents, selected from the group consisting of ε-aminocaprolactam, polyvinylpyrrolidone-methacrylate copolymer, and mixtures thereof.

8. A process as claimed in claim 1, including adding additives in at least one of steps (a) and (b) concurrently with the water-containing cellulose and the water-containing amine oxide.

9. A process as claimed in claim 1, raising the temperature in steps (a), (b), and (c) in accordance with a rising temperature profile in the range 50–130° C. and lowering the temperature in step (d) in accordance with a falling temperature profile in the range 130–60° C., wherein the final temperature of step (d) is substantially maintained in steps (e) and (f).

10. A process as claimed in claim 1, wherein the composition of the mixture in steps (b) to (d) is controlled by rotary speed of the kneader screws, the vacuum and the bulk temperature, wherein the solution quality is monitored by the pressure difference in the safety filter.

11. A process as claimed in claim 1, wherein a temperature controlled screw conveyor is used as a buffer between the mixing/kneading reactor and the consumer.

12. A process as claimed in claim 1, wherein a shear gradient in the safety filter is less than 5 [1/sec].

13. A process as claimed in claim 1, wherein a shear gradient in the feed pumps to the safety filter and consumer is less than 5 [1/sec].

14. A process as claimed in claim 1, wherein the separated solution quality is characterized by measuring particle content and particle distribution by means of laser diffraction.

15. A process as claimed in claim 1, wherein the separated solution is characterized by the zero shear viscosity, relaxation time/relaxation time spectrum and the molecular dispersity, determined from rheological data.

16. A process as claimed in claim 1, wherein the water-containing amine oxide is a N-methyl-morpholine N-oxide containing between 23 and 45% by mass of water.

17. A process as claimed in claim 16, wherein the water-containing cellulose contains 35–49% by mass of water.

18. A process as claimed in claim 1, wherein the water-containing amine oxide is a N-methyl-morpholine N-oxide containing between 7 and 45% by mass of water.

19. Apparatus for continuous single-stage production of a homogeneous solution of cellulose in water-containing amine oxide, comprising a kneading and mixing reactor having a heating zone followed by a cooling zone, a driver unit for driving the reactor, a vacuum station comprising a plurality of vacuum tight metering units communicating with at least the heating zone of the kneading and mixing reactor, a screw conveyor for receiving material from the kneading and mixing reactor, pump means for receiving material from the screw conveyor, safety filter downstream of the pump means and upstream of a conveyor.

20. Apparatus as claimed in claim 19, wherein the reactor is a horizontal twin-screw co-rotating-processor.

21. Apparatus as claimed in claim 19, wherein the reactor is a horizontal twin-screw opposite rotating processor.

22. Apparatus as claimed in claim 19, wherein the reactor is a horizontal single-screw discotherm B-conti processor.

23. Apparatus as claimed in claim 19, wherein the cellulose is metered using a control piston pump.

24. Apparatus as claimed in claim 19, including a double piston for doser metering additives.

25. Apparatus as claimed in claim 19, including a combination of heatable feed pump and steerable closed-loop control valve for metering a water-containing amine oxides and low-viscosity additives.

26. Apparatus as claimed in claim 19, wherein high-viscosity additives are metered including precision gear pumps for metering high-viscosity additives.

27. Apparatus as claimed in claim 19, wherein the screw conveyor is a high-volume, vertically disposed twin-screw conveyor.

* * * * *